United States Patent [19]

Stirling

[11] Patent Number: 5,195,867
[45] Date of Patent: Mar. 23, 1993

[54] SLURRY PUMP SHAFT SEAL FLUSHING

[75] Inventor: Thomas E. Stirling, Sugarloaf, Pa.

[73] Assignee: Barrett, Haentjens & Co., Hazleton, Pa.

[21] Appl. No.: 847,775

[22] Filed: Mar. 5, 1992

[51] Int. Cl.⁵ .......................................... F01D 25/18
[52] U.S. Cl. ................... 415/111; 415/170.1; 415/175
[58] Field of Search ............ 415/110, 111, 170.1, 415/175, 176, 208.1, 211.2; 277/68, 69

[56] References Cited

U.S. PATENT DOCUMENTS

| | | | |
|---|---|---|---|
| 2,835,203 | 5/1958 | Cliborn | 415/110 |
| 3,076,412 | 2/1963 | Harker et al. | 415/170.1 |
| 3,680,976 | 8/1972 | Buse | 415/110 |
| 3,693,985 | 9/1972 | Dillner | 415/111 |
| 3,829,238 | 8/1974 | Speck | 415/200 |
| 3,914,072 | 10/1975 | Rowley et al. | 415/111 |
| 4,795,167 | 1/1989 | Otsuka | 415/111 |
| 4,812,108 | 3/1989 | Kotera | 415/111 |

FOREIGN PATENT DOCUMENTS 151196 11/1980 Japan ........................ 415/208.1

*Primary Examiner*—John T. Kwon
*Attorney, Agent, or Firm*—Hill, Steadman & Simpson

[57] ABSTRACT

A pump assembly includes a shaft driven rotary impeller operating in a housing and adapted for pumping a stream of material-carrying liquid through a pump chamber in the housing, with an annular seal assembly operative about a portion of the impeller shaft where the shaft extends through a wall of the housing. An annular seal chamber about the annular seal is adapted for receiving impeller driven seal lubricating and cooling liquid from the stream. A vane arrangement causing a sweeping flow of the liquid moves through the seal chamber with flushing effect.

13 Claims, 2 Drawing Sheets

5,195,867

SLURRY PUMP SHAFT SEAL FLUSHING

BACKGROUND OF THE INVENTION

The present invention relates to improvements in pumps for handling material-carrying liquid, and generally referred to as slurry pumps. More particularly, the invention relates to avoiding premature failure of the seal means for that portion of a slurry pump impeller shaft where it enters the pump shroud or housing.

Slurry pump mechanical shaft seals, for which the slurry liquid is depended upon as lubricant and coolant, are vulnerable to damage from particulate slurry solids which are often quite abrasive. Various expedients have been proposed for alleviating this problem.

One of the more successful schemes for protecting the mechanical seals of slurry pump shafts, especially of the double seal design, has been to flush the area, in which the seal faces operate, by means of pressurized clean flushing liquid, sometimes referred to as barrier fluid, maintained at a pressure level higher than that developed by the pump so that any leakage of the clean liquid is into the slurry. This protects the seal faces from the abrasive action of the slurry solids. However, this scheme has proved to be expensive and requires installation of a pressurizing and flushing liquid circulating system.

With the development of harder slurry materials, such as silicon carbide, attempts have been made to use single seals, without external flushing, in slurry pumps and to attain seal lubrication and cooling by receiving some of the pumped slurry in respective chambers about the seals, through chamber openings exposed to the pumped slurry passing the openings. This has been unsatisfactory for a number of reasons. Generally, the seal chambers have been in spaces which were originally designed for conventional packing, and this has proved to be inadequate because the spaces tended to fill up with destructive packed solids. Another deficiency was that air or vapor tended to collect in the seal areas with deleterious effect on the seals for lack of cooling.

Attempts by the seal manufacturers to alleviate these problems consisted in mounting the seals in flexible arrangements to tolerate shaft excursions which generally occur due to wear deterioration after a time of service of a slurry pump. It was also determined that the space surrounding the seal must be much larger to accommodate pump forced slurry liquid to effect cooling circulation of the seals. These developments improved the reliability of the single slurry pump seals. However, the centrifugal separation effect of the impeller generated vortex in the impeller casing gap from which the lubricating/cooling pumped slurry is received in the seal chamber, still tended to concentrate solid material in the seal area, and caused an insulative air or gas pocket to form around the seal faces, thus restricting the flow of cooling and flushing liquid in the seal chambers. An attempted remedy was the use of so-called "vortex breakers" consisting of ribs protruding into the seal area.

A mechanical slurry pump seal of the kind under discussion depends on having liquid around the seal faces such that not only is there a solids-flushing action but also a sustained liquid film between the faces. The liquid around the faces must remove heat generated by the action of the seal faces. It is therefore important to insure that liquid in motion is always present around the seal faces. But, as has just been explained, this result has not been satisfactorily attained heretofore.

SUMMARY OF THE PRESENT INVENTION

An important object of the present invention is to provide a new and improved means and method for overcoming the seal-lubricating, cooling and flushing problems that have been experienced heretofore in respect to slurry pump shaft seals.

Another object of the present invention is to provide a new and improved slurry pump shaft seal protection system which is positive, simple, efficient, inexpensive and reliable.

Still another object of the invention is to provide new and improved means and method for causing efficient sweeping flow flushing of slurry pump shaft seals.

Pursuant to the present invention, there is provided a pump assembly including a shaft driven rotary impeller operating in a housing and adapted for pumping a stream of material-carrying liquid through the housing, and comprising annular seal means operative about a portion of the impeller shaft where the shaft extends through a wall of the housing, means defining an annular seal chamber about the seal means for receiving impeller driven seal lubricating and cooling liquid from said stream, and means for causing a sweeping flow of said stream liquid to move through said chamber with flushing effect.

BRIEF DESCRIPTION OF THE DRAWINGS

Other objects, features and advantages of the invention will be readily apparent from the following description of certain preferred embodiments thereof, taken in conjunction with the accompanying drawings, although further variations and modifications may be effected without departing from the spirit and scope of the novel concepts of the disclosure, and in which.

DETAILED DESCRIPTION

Figure 1:
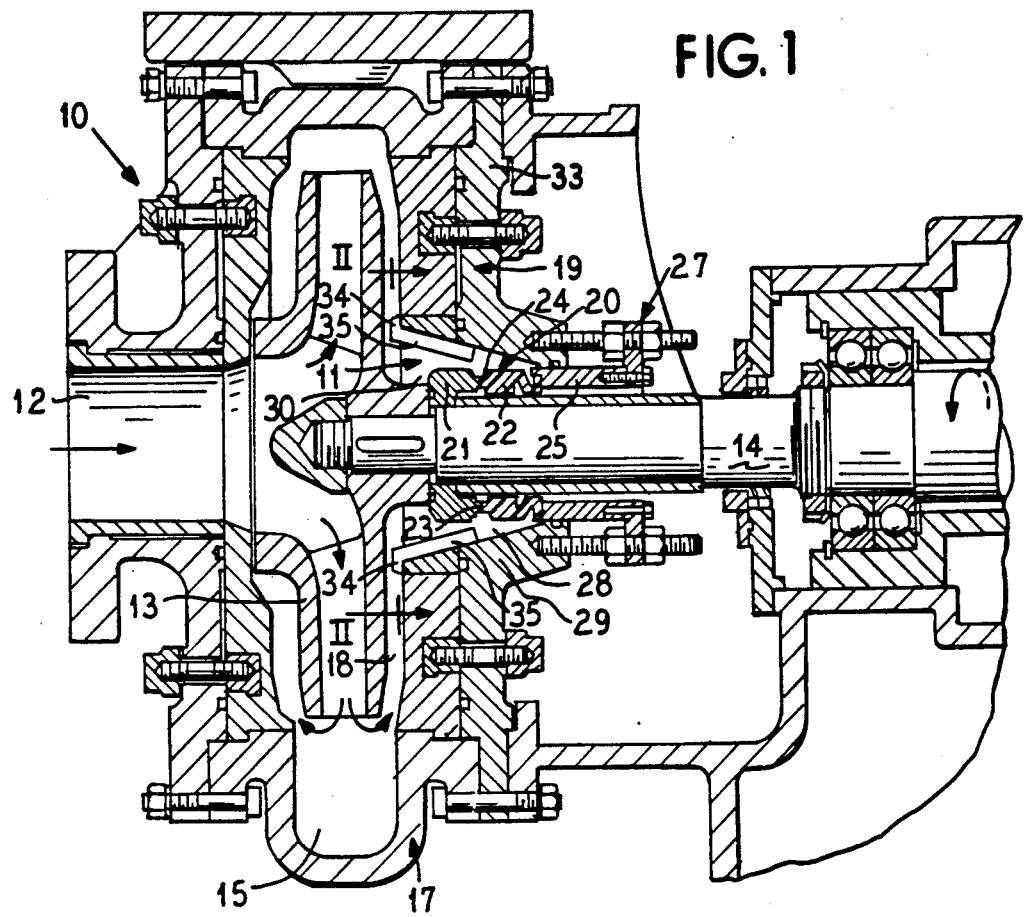
FIG. 1 is a longitudinal sectional detail view through a slurry pump assembly embodying the present invention.

FIG. 1 shows a conventional centrifugal slurry pump 10 embodying a new and improved shaft seal cooling arrangement 11.

In brief, the pump 10 comprises an inlet or suction port 12 through which material-carrying liquid, i.e. slurry, enters as shown by directional arrow under the draft or suction action of an impeller 13 keyed to the end of a drive shaft 14 Which, in the present case, is driven lefthand or counterclockwise by suitable means, such as an electrical motor (not shown), as is customary. In its rotation, the impeller 13 pumps a stream of the material-carrying liquid from the port 12 through a pump chamber 15 in a shroud or housing assembly 17 and out of a conventional delivery port (not shown). As part of the pump chamber 15, there is a clearance gap 18 between the impeller 13 and a wall 19 of the housing 17 and through which wall the shaft 14 extends to its attachment to the impeller 13.

Annular mechanical seal means 20 are operative about a portion of the impeller shaft 14 where the shaft extends through the wall 19 of the housing 17, for preventing leakage of the material-carrying liquid, from the pump chamber 15 past the shaft 14. In an especially desirable form, the seal means 20 comprises what is generally referred to as a single shaft seal, consisting in this instance of an annular rigid seal ring 21 carried rotatably by the shaft 14, and a cooperating stationary elastic, i.e. rubber type, seal ring 22 which thrusts an annular seal face 23 thereon against a complementary seal face 24 on the seal ring 21. A thrusting annulus 25 carries and drives the seal ring 22 toward the seal ring 21 under the influence of a flange-screw and nut take-up assembly 27 which can be axially adjusted for taking up wear between the seal faces 23 and 24.

Because of the frictional contact of the relatively rotatably engaging seal faces 23 and 24, there is, understandably, development of frictional heat in operation. For the alleviation of the frictional heat problem, means are provided for attaining a flow of lubricating and cooling liquid from the stream of liquid pumped by the impeller 13. In particular, an annular seal chamber 28 is defined about the seal 20 by means of structure 29 which is part of the housing wall 19. In a preferred form, the chamber 28 is of generally frusto-conical tapered configuration having a wide mouth entrance 30 open to the pump chamber gap 18 so that liquid from the stream driven by the impeller can be effectively received in the seal chamber 28.

Figure 2:
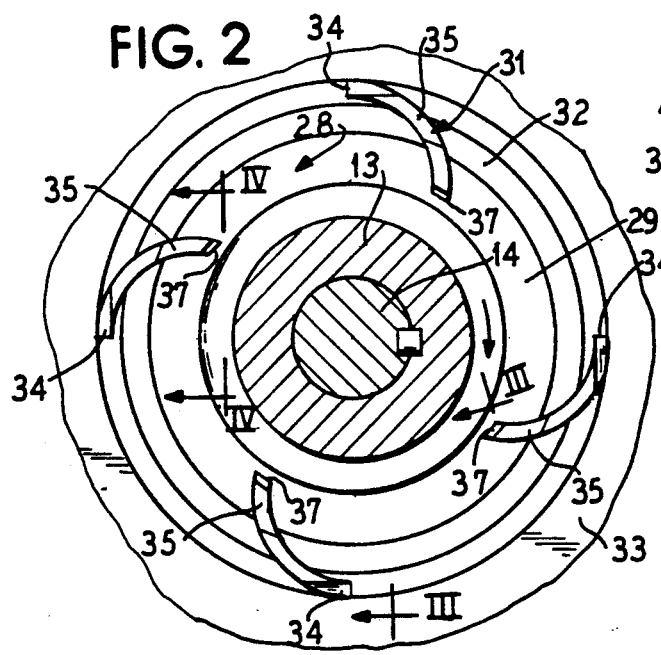
FIG. 2 is a sectional detail view taken substantially along the line II—II in FIG. 1.
Figure 3:
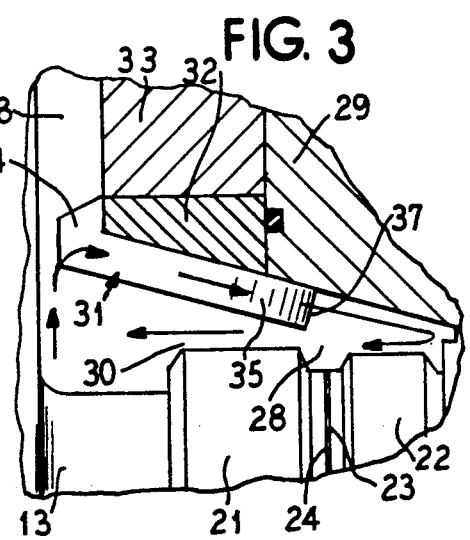
FIG. 3 is an enlarged fragmentary sectional detail view taken substantially along the line III—III in FIG. 2.
Figure 4:
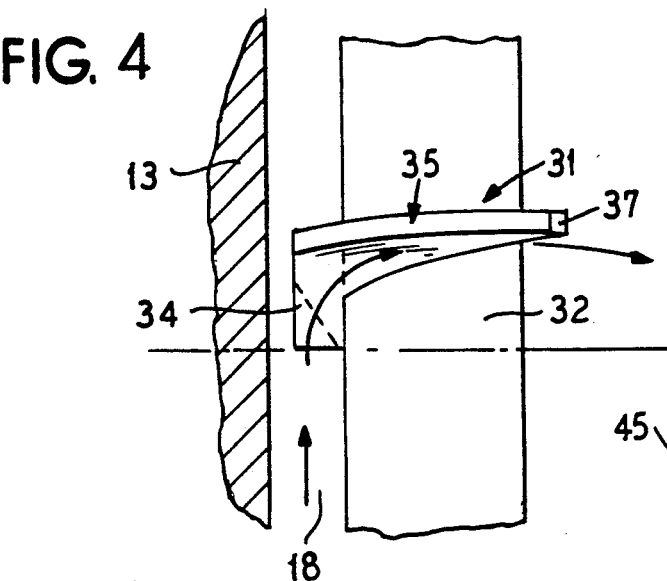
FIG. 4 is a detail view taken substantially along the line IV—IV in FIG. 2.

In order to avoid any tendency toward premature seal failure by destructive accumulation of material from the liquid, or air or gas pocket stagnation around the seal faces 23 and 24, within the seal chamber 28 due to the centrifugal separation effects of the impeller generated vortex or spinning flow tangential action of the liquid as it is impelled through the gap 18 from which the liquid is received in the chamber 28, means are provided for causing a sweeping flow of the liquid to move through the chamber 28 with flushing effect. To this end a circulation system is provided, comprising curved vane means 31 mounted fixedly in the chamber entrance 30 and projecting into the chamber 28, as best seen in FIG. 1, 2 and 3, causing the liquid to be diverted from the gap 18 with a generally sweeping flushing flow as exemplified by directional arrows in FIG. 3. A convenient manner of installing the vanes 31 comprises mounting ring means 32 which is conveniently press fitted to a cheek or liner plate 33 on the inner face of the wall 19 at the chamber entrance 30.

In a desirable construction, there may be from one to ten of the impeller or sweeping vanes 31, depending on the diameter of the pump at the seal 20 and the intensity of sweeping flow flushing desirable for attainment of the maximum benefit in any preferred pump size. Each of the vanes 31 has a liquid diverting tail portion 34 which projects into the pump chamber gap 18 for assisting entry of liquid into the seal chamber, and a curved liquid flow biasing body 35 which projects into the seal chamber 28 and with an inner vane end 37 which is efficiently adjacent to the seal faces 23 and 24. As a result, there is attained by operation of the vanes 35 effective slurry pump shaft seal protection as the vanes divert liquid from the pump chamber gap 18 into the seal chamber 28, and in the seal chamber effect efficient, reliable sweeping flow flushing of the seal assembly 20. This assures a steady supply of seal face lubricating and cooling liquid to circulate positively into and through the chamber 28 where the liquid constantly sweeps the seal area during operation of the pump.

Figure 6:
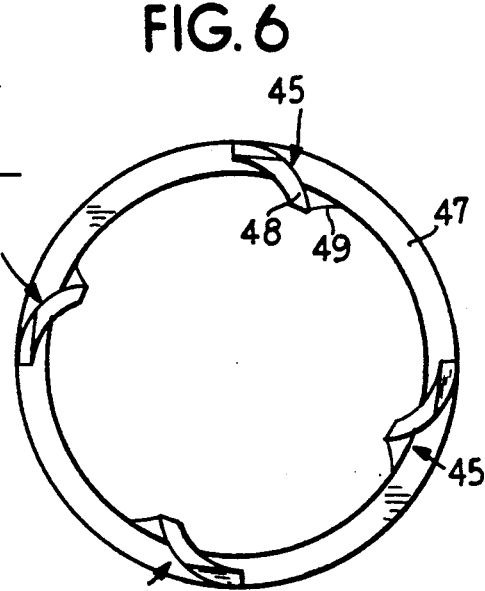
FIG. 6 is a plan view of the vane ring of FIG. 5.
Figure 5:
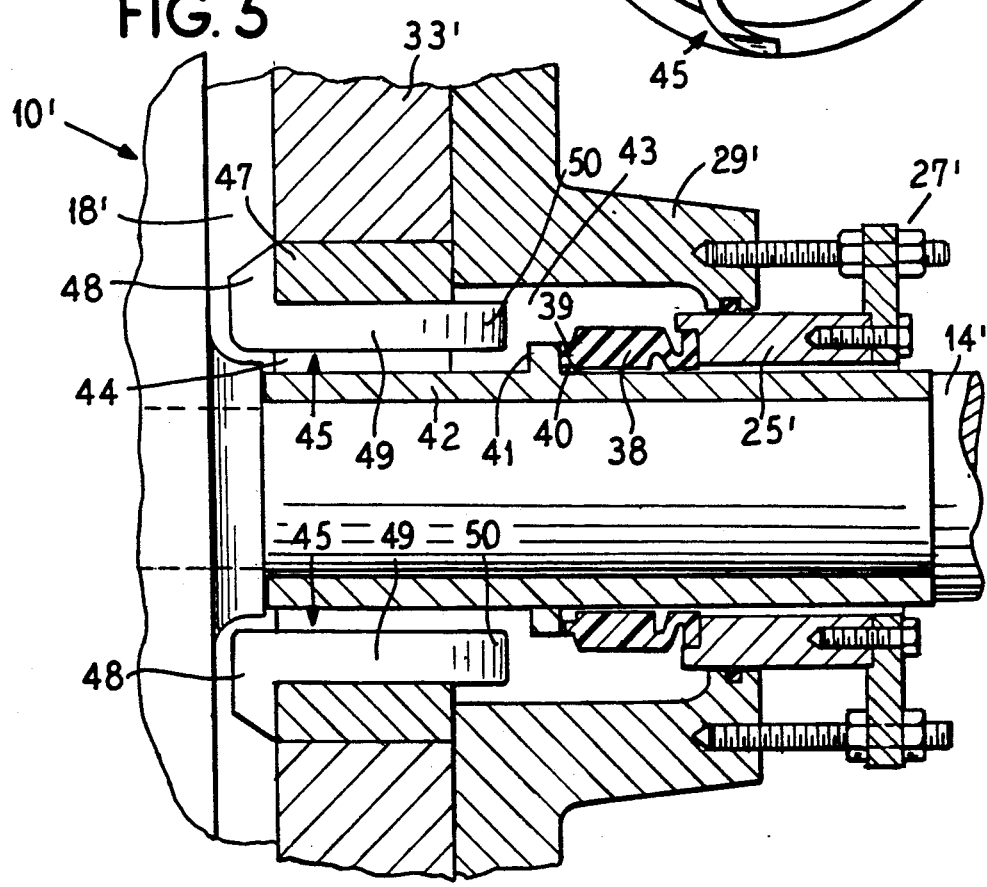
FIG. 5 is a fragmentary longitudinal sectional detail view through a slurry pump showing a modified shaft seal arrangement.

In FIGS. 5 and 6 a slightly modified pump 10' is depicted, which is especially suitable for smaller size pumps, and wherein the pump assembly is essentially the same as in FIG. 1, similar structural parts being identified by primed reference numerals. In the pump 10' a single shaft seal ring 38 is mounted about the shaft 14' in stationary manner and has a sealing face 39 which thrusts sealingly against a complementary axially facing sealing face 40 on an annular radially extending seal rib 41 which may be integral with a renewable shaft sleeve 42 fixed about the shaft 14'. A generally cylindrical configuration seal chamber 43 is defined about the seal 38 by the pump housing member 29'.

Sweeping flow of liquid with flushing effect from the pump chamber gap 18' into an entrance 44 into the seal chamber 43 is promoted by one or more, in this instance, four, vanes 44 attached to or integral with a vane ring 47 carried by the wear cheek plate 33'. Each of the vanes 45 has a liquid diverting tail portion 48 which projects into the pump chamber gap 18', and a curved liquid propelling body portion 49 which projects into the seal chamber 43, with an inner end portion 50 of the vane adjacent to the seal elements 38 and 41 and more particularly the seal faces 39 and 40. Thereby efficient sweeping flow of the pumped liquid is caused to move through the chamber 43 with flushing effect. Accumulation of solids in the chamber 43 is prevented and stagnation of air in the chamber is avoided, but an efficient lubricating and cooling flow of the liquid is attained at the relatively rotatably frictionally engaged seal faces 39 and 40.

It will be apparent that various modifications and/or additions may be made in the apparatus of the invention without departing from the essential features of novelty involved, which are intended to be defined and secured by the appended claims.

I claim as my invention:

1. A pump assembly including a shaft driven rotary impeller operating in a pump chamber within a housing and adapted for pumping a stream of material-carrying liquid through the pump chamber, and comprising:

annular seal means operative about a portion of the impeller shaft where the shaft extend through a wall of the housing;

said seal means including relatively rotatable seal elements having relatively rotatably slidably engaged seal faces;

means on said wall for defining an annular seal chamber about said seal means and providing an entrance leading from said pump chamber into said seal chamber for receiving impeller driven seal lubricating and cooling liquid from said stream;

a cheek plate lining said wall within said pump chamber and having an inner diameter about said entrance; and means for causing a sweeping flow of said stream liquid to move through said chamber with flushing effect comprising a plurality of vanes mounted on said cheek plate inner diameter and having ends at said entrance, said vanes extending from said entrance into said seal chamber and beyond said cheek plate generally toward said seal faces for impelling efficient cooling flow of the liquid directly onto said sealing surfaces and in flushing relation through said seal chamber wherein said entrance of each vane has a tail portion for assisting entry of liquid into said seal chamber, and a curved vane body extending into said chamber for causing said sweeping flow.

2. A pump assembly according to claim 1, wherein said seal chamber is of generally frusto-conical tapering cross sectional configuration with a wide end entrance for receiving material from the impeller pumped stream of liquid.

3. A pump assembly according to claim 1, wherein said seal chamber is of generally cylinderical configuration.

4. A pump assembly according to claim 1, wherein said seal means comprises an annular seal member replaceably supported in on-rotary position on said wall, and a seal member comprising a rib integral with a sleeve co-rotably carried by said shaft, and said seal member and seal rib have complementary relatively slidably engaged seal faces exposed to said seal chamber.

5. A pump assembly according to claim 1, including a ring member carried by said check plate, and said vanes attached to said ring member.

6. A pump assembly including a shaft driven rotary impeller operating in a housing and adapted for pumping a stream of material-carrying liquid through the housing, and comprising:
   annular seal means operative about a portion of the impeller shaft where the shaft extends through a wall of the housing;
   means defining an annular seal chamber about said seal means for receiving impeller driven seal lubricating and cooling liquid from said stream; and
   means for causing a sweeping flow of said stream liquid to move through said seal chamber with flushing effect, comprising at lease one vane having a tail portion for assisting entry of liquid into said seal chamber, and a curved vane body extending into said seal chamber for causing said sweeping flow.

7. A pump assembly according to claim 6, wherein a ring member mounted about an entrance from said pump chamber into said seal chamber carries said vane.

8. A pump assembly including a housing having a pump chamber therein and a shaft driven rotary impeller in said housing, with a portion of the impeller shaft extending through a wall of the housing, said impeller being rotatably operable for pumping a stream of material-carrying liquid through said pump chamber, and comprising:
   an annular seal assembly operative about a portion of said shaft where the shaft extends through said wall of the housing;
   said seal assembly comprising members having cooperating relatively rotatable seal faces;
   mean on said wall defining an annular seal chamber about said seal assembly;
   said seal chamber being open to said pump chamber; and
   vane means mounted on said housing wall and causing a sweeping flow of said liquid to move into and through said seal chamber with seal lubricating and cooling effect, comprising at least one vane having a tail portion for assisting entry of said liquid into said seal chamber, ad a curved vane body extending into said seal chamber for causing said sweeping flow.

9. A pump assembly according to claim 8, wherein said seal chamber is of generally frusto-conical tapering cross sectional configuration with a wide end entrance for receiving material from the impeller pumped stream of liquid.

10. A pump assembly according to claim 2, wherein said seal chamber is of generally cylindrical configuration.

11. A pump assembly according to claim 8, wherein said seal assembly comprises a seal member mounted rotatably with said impeller shaft, and a seal member mounted in stationary relation with said wall, and said seal members have complementary relatively slidably engaged seal faces.

12. A pump assembly according to claim 8, wherein said seal assembly comprises an annular seal member replaceably supported in non-rotary position on said wall, and a seal member comprising a rib rotatably carried by said shaft, and said seal member and seal rib have complementary relatively slidably engaged seal faces exposed to said seal chamber.

13. A pump assembly according to claim 8, wherein said means for causing said sweeping flow comprises at least one curved vane.

* * * * *